Nov. 9, 1954  A. W. CALDER  2,693,950
DUST WETTING AND REMOVING APPARATUS
Filed Jan. 12, 1950

Inventor:
Alexander W. Calder.

by Louis A. Maxom.
Attorney.

United States Patent Office 2,693,950
Patented Nov. 9, 1954

2,693,950

DUST WETTING AND REMOVING APPARATUS

Alexander W. Calder, Franklin, Pa., assignor to Joy Manufacturing Company, Pittsburgh, Pa., a corporation of Pennsylvania Application January 12, 1950, Serial No. 138,121

3 Claims. (Cl. 262—29)

This invention relates to mining apparatus, and more particularly to apparatus for suppressing the dust which is created during the attacking of a mineral in a vein and/or during the loading of a mineral after its detachment from a vein. It has especial application to "continuous miners" and their use, and, though it is not limited to such apparatus, and the operation thereof, it may very conveniently be described with respect thereto.

In a well-known form of "continuous miner," coal—this being the mineral so far most commonly attacked by "miners"—is torn from the face by the relatively continuous attack on a vein or seam by a large number of disintegrating elements moving in orbital paths. The coal (or other mineral) is moved away from the face by the chains which commonly carry the disintegrating elements, a plurality of such chains being provided and forming in effect a conveyor providing an outwardly traveling, disintegrated material-moving surface. A very large amount of dust may be created in the disintegrating operation, and, if this dust were not promptly removed from the air, a possibly serious explosion and fire hazard might be created. Also visibility might be seriously impaired, with danger of injury as a result of the inability of a miner or his helper to see clearly what was going on.

Efforts have been made to solve this dust problem by directing jets of water at high pressure directly against the points of attack of the disintegrating elements on the seam or vein of mineral, but these efforts were not satisfactorily successful.

I have discovered that by the employment of a plurality of jets of water sprayed into the air under a considerable pressure and through nozzles of appropriate size and appropriately directed, it is possible very effectively to allay a very large percentage of the dust produced and to maintain very satisfactory conditions of visibility. "Miners" now include disintegrating mechanism swingable in vertical planes, and material-receiving and conveying means to which the disintegrating mechanism discharges and relative to which the disintegrating mechanism is swingable in vertical planes. I have found that it is desirable to arrange water sprays both on the vertically swingable disintegrating apparatus and rearwardly of the latter in suitable relationship to the conveying means which receives material from the disintegrating apparatus and that the use of very fine sprays forwardly, to produce a very large number of fine water particles which may encounter and wet the dust particles, together with the use of coarser sprays rearwardly to promote turbulence and clear away the mist produced by the forward sprays, gives very satisfactory results.

It is an object of my invention to provide improved apparatus for allaying dust during an attack upon a mineral vein and/or during the handling of the material detached and/or disintegrated. It is another object of my invention to provide an improved dust allaying arrangement for use with a mining apparatus, and particularly for use with a "continuous miner." It is a further object of the invention to provide an improved dust allaying arrangement providing both for the making available of a great number of water particles for contacting dust particles, and also for effecting a turbulence greater than there would normally be with only the mist which such water particles would form, and also further for preventing impairment of visibility by the mist and dust. It is a further object of the invention to provide an improved arrangement of water sprays on a continuous mining apparatus. Other objects and advantages of the invention will hereinafter more fully appear.

In the accompanying drawings, in which one illustrative embodiment of the invention is shown, Figure 1 is a plan view of the forward end of a "continuous miner," in conjunction with which improved water spraying means, constructed and arranged according to the illustrative embodiment of the invention, have been provided.

Figure 1:
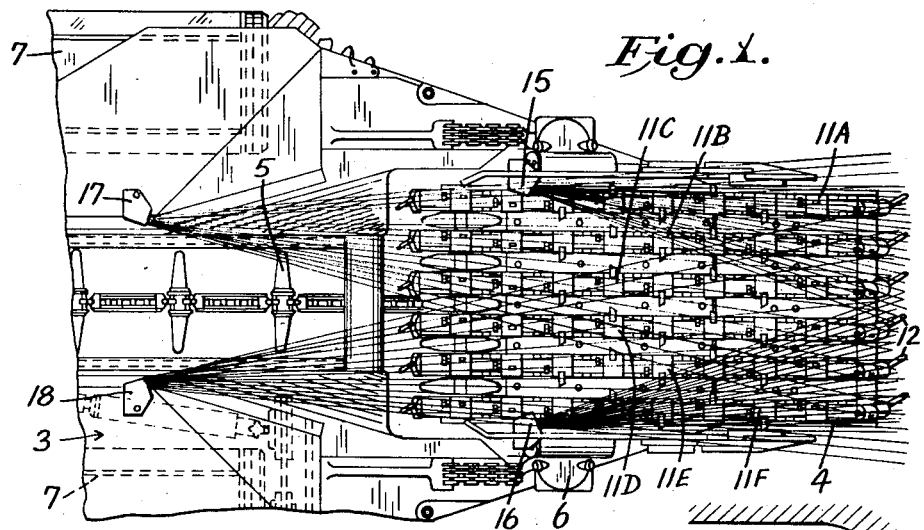

Referring now to the drawings, it will be noted that a suitable mounting 1, herein shown as of the crawler or tractor type, supports a turntable mechanism 2 which carries for rotation about a vertical axis a disintegrating and material-handling apparatus generally designated 3. This includes a disintegrating apparatus proper, 4, and a material-receiving and moving apparatus, 5. Both, with the structure illustrated, are enabled to be advanced and retracted with respect to a working face, and the disintegrating apparatus 4 is adapted to be swung upwardly and be allowed to swing downwardly about a horizontal transverse pivot P under the control of an upswing apparatus 6; and the disintegrating apparatus is driven, through suitable power transmission connections, not shown, by motors 7 arranged at opposite sides thereof. Suitable clean-up mechanism 8 may be provided if desired.

The structure described is shown in the main in other now pending applications owned by my assignee, and in the event that more detail is desired, the patents to be granted on those applications may be consulted. The disintegrating arrangement is shown in an application of John R. Sibley, Serial No. 102,996, filed July 5, 1949, for Apparatus for Continuous Mining; and the means 6 for effecting upswing of the disintegrating apparatus 4 in vertical planes is disclosed in the application of John D. Russell, Serial No. 95,673, filed May 27, 1949, for Continuous Mining Apparatus, now abandoned. The disintegrating apparatus includes, as shown, six chains 11A, 11B, 11C, 11D, 11E and 11F. These carry disintegrating elements 12 arranged in suitable patterns on the chains, and the chains are circulated by power by driving mechanism, not illustrated, at their rearward ends. The chains are also vertically swingable upwardly by power, and downwardly by gravity, by the apparatus 6.

A common mode of operation is to lower the forward end of the disintegrating apparatus so that it is at the level of the main floor at its lower side, to sump it into the mineral vein near the lower limit of the latter, to swing it upwardly by power about pivot P after sumping has reached an appropriate depth, and to retract it, when the disintegrating mechanism has had its forward end raised to a desired height, to form a plane roof for the mine chamber.

During these operations, as has been intimated above, a very large amount of dust will be created, due to the tearing action and the high speed of movement of the disintegrating devices, due to the fact that in the course of cleaning up of the mine bottom a substantial amount of fine coal which has been collected by the clean-up devices 8 is brought into the field of action of the disintegrating apparatus, and due to the throwing of a substantial amount of coal (or other mineral) by the outwardly moving runs of the disintegrating chains 11A to 11F.

To allay the dust produced by the operation of vein-attacking and detached material-handling apparatus, it is important to wet the dust sufficiently to increase its rate of precipitation both by increasing its weight, and by causing the moistened particles to adhere to each other. In reason, the larger the number of water particles, the greater the prospect of "collision" between water and dust particles. However, a mist which provides a large number of water particles may itself have a tendency to lessen visibility at the face and to remain in suspension in the air. If there be provided, however, means for introducing a much higher degree of turbulence than mist nozzles would provide, and particularly if that means uses as its turbulence-providing agency a spray of water droplets much heavier than the particles that form the mist, and having therefore a greater momentum, and a greater wetting capacity, and a better turbulence-creating capacity because of an increased ability to set the air which they traverse in motion, there is made available a very desirable combination of spray instrumentalities for accomplishing dust allaying, without the use of excessive quantities of water, and with the prevention of aggrevating the problem of visibility.

To accomplish the foregoing mode of operation in one desirable manner, I have found it desirable to provide a plurality of water jets mounted on the disintegrating apparatus for moving upwardly and downwardly therewith and a plurality of other water jets mounted substantially to the rear of the disintegrating apparatus and substantially stationary, as regards their directions of discharge, while the jets which are mounted on the disintegrating apparatus vary their direction of discharge as the disintegrating apparatus is swung upwardly and downwardly. Of course all the jets shift position as the apparatus is adjusted laterally about the turntable axis to attack new places on the face. I have herein shown two water jets 15 and 16 mounted at the opposite sides of the disintegrating apparatus. These are spray-forming jets and desirably have their relatively fine sprays directed in intersecting paths. The cone angle of the discharge of these nozzles is such that between them they may cover the full width of the forward end of the disintegrating apparatus. They are directed obliquely longitudinally of the disintegrating apparatus, and a satisfactory arrangement was found to be provided by so aiming the nozzles that their axes were directed just about at the point of emergence from the face of the outwardly moving disintegrating elements.

I further found, as above noted, that it is advantageous to arrange two other nozzles, 17 and 18, at opposite sides of the material-receiving and delivery conveyor 5, and these nozzles, which are closer to each other than the nozzles 15 and 16 are, desirably have the axes of their discharge so aimed that their discharge will pass 6" to 8" above the center line of the drive shaft. Thus their discharge will wet the outward end of the orbitally moving disintegrating chains and also in certain lowered positions of the latter the full lengths of the top rows thereof and also the face above the disintegrating mechanism.

The jets will be supplied with water under a comparatively high pressure, perhaps 400 pounds per square inch, and in appropriate quantity. The nozzle openings of the rearward nozzles may be on the order of $\%_{64}$" diameter. These nozzles will therefore discharge a relatively coarse spray of water droplets, capable of inducing a substantial air flow, and of producing a good deal of turbulence in the space into which they discharge. The forward nozzles will have smaller discharge openings, and will produce a fine spray of a great number of particles of water.

The forward nozzles will fill the air at the forward end of the disintegrating apparatus with a fine mist and will wet down the face of the vein at the area thereof which is under attack and the dust adjacent thereto. They will provide a great number of water particles in suspension in the air and ready to moisten the coal or other particles which they may contact. The rearward nozzles will discharge as it were continuous blasts of water droplets of sizes principally larger than the particles which form the mist and having sufficient momentum to create a considerable turbulence in the area into which said sprays are discharged and to draw enough air with their blasts to augment the turbulence-effecting action and to tend to prevent a fog at the face, both by an action similar to that of a shower on a fog and by a displacement from the working zone of the dust-water fog.

I have shown two nozzles 17 and 18, but it is to be noted that one of these nozzles can be dispensed with and still have provided the desired dust allaying action.

It will be understood that I have provided improved apparatus to allay dust in which through the cumulative action and coaction of coarse and fine sprays, there will be effected, before the dust particles can escape and pass into the entry behind the apparatus, a wetting and suppressing of substantially all such particles. The crea- tion of a churning and washing action, superimposed on the wetting action of the fine sprays, will insure an extremely thorough mixing of the dust with the water particles and an assured wetting and allaying of the dust.

I have not illustrated in the drawing any source of water at high pressure, as this may obviously be provided through hoses from an outside source, or taken, either from an outside source or a tank on the apparatus, at a lower pressure and pumped by a hydraulic force pump on the apparatus up to the desired terminal pressure.

By reason of my invention very substantial advantages in addition to those already mentioned are accomplished. In comparison with conventional low pressure spraying of the face itself, there is a saving of a substantial quantity of water, and this has a number of advantages besides water economy. The bottom, when of fire clay, is not softened to nearly the degree which occurs with the earlier procedures: and the coal fines can be handled better in a merely moistened condition than when in a thoroughly soaked condition with the interstices between the particles filled with free water; and, moreover, coal plants using air cleaning processes can take and handle the coal from apparatus constructed in accordance with and using my invention, because the moisture content of the fines is well within the allowable amount, whereas, with the old spraying technique the dust problem could not be satisfactorily met at plants using air cleaning, since the use of an amount of water necessary to suppress the dust was precluded by the necessity of avoiding excessive amounts of water in the fines.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a vein attacking and disintegrating apparatus, in combination, a frame, a disintegrating mechanism pivotally mounted on said frame on a horizontal axis for swinging in vertical planes and having material disintegrating elements moving in vertical orbits around its periphery, and means for wetting down the dust produced by the operation of such mechanism comprising means to maintain a mist adjacent a working face including liquid discharging devices mounted on said mechanism for swinging with the latter and located near the end of the latter spaced from a working face and discharging intersecting expanding jets of finely divided particles of liquid which substantially cover the full width of the front end of said disintegrating mechanism, and means to create turbulence in said mist including other liquid discharging devices mounted on said frame further from a working face than said first liquid discharge devices and discharging intersecting expanding jets of liquid droplets larger than the finely divided particles and which intersect further from the face than the point of intersection of said first mentioned jets.

2. In a vein attacking and disintegrating apparatus, in combination, a disintegrating mechanism swingable in vertical planes and having material disintegrating elements moving in vertical orbits around its periphery, and means for wetting down the dust produced by the operation of such mechanism on a working face, comprising means for effecting the maintenance of a water mist in the air adjacent a working face and including forward nozzles discharging intersecting streams of finely divided particles, and means to effect the creation of a high degree of turbulence in the mist including rearward nozzles discharging intersecting streams of larger particles into the mist.

3. In combination, an apparatus for attacking a mineral vein and disintegrating a portion thereof, said apparatus producing in its operations upon the vein a substantial amount of dust, means to maintain a mist including forward nozzles discharging finely divided particles forwardly and obliquely towards each other and means to create turbulence in said mist including rearward nozzles discharging large droplets forwardly and obliquely towards each other.

(References on following page)

References Cited in the file of this patent

UNITED STATES PATENTS

| Number | Name | Date |
|---|---|---|
| 2,579,282 | Vicard | Dec. 18, 1951 |

OTHER REFERENCES

Figure 2:
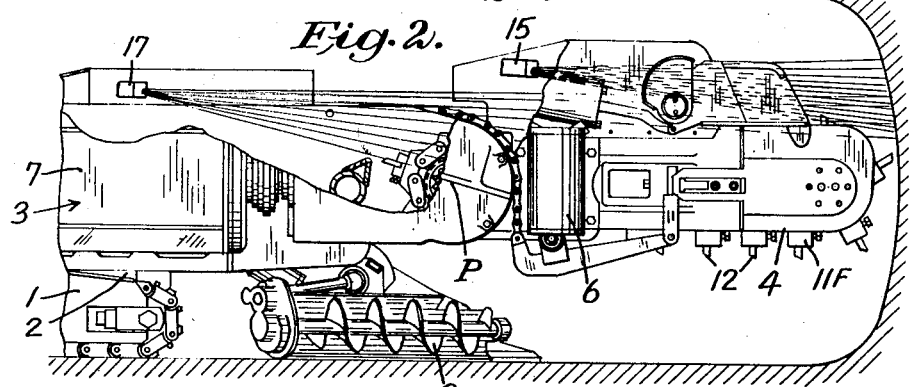
Figure 2 is a side elevational view of the apparatus of Figure 1, with parts broken away so that the water sprays at the far side of the central longitudinal vertical plane of the apparatus may be readily seen.
Figure 3:
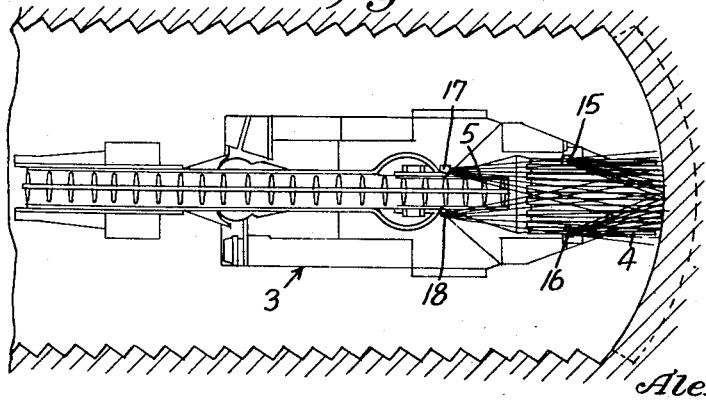
Figure 3 is a diagrammatic view showing a "miner" in operation in an entry.

Investigation Report #3843 of the Bureau of Mines, Title: Suggested Methods for Installing Dust-Allaying Equipment in Bituminous-Coal Mines, by C. W. Owing, November 1945. Figs. 2, 8, 10, 11, 12, 14, 15, 16, 17, 18, 20, 25 and 26.